E. R. SWAN.
POWER TRANSMITTING MECHANISM.
APPLICATION FILED JUNE 24, 1916.

1,225,075.

Patented May 8, 1917.

INVENTOR.
E. R. SWAN.
BY HIS ATTORNEY

UNITED STATES PATENT OFFICE.

EUGENE R. SWAN, OF BILLINGS, MONTANA.

POWER-TRANSMITTING MECHANISM.

1,225,075.    Specification of Letters Patent.    Patented May 8, 1917.

Application filed June 24, 1916. Serial No. 105,761.

*To all whom it may concern:*

Be it known that I, EUGENE R. SWAN, a citizen of the United States, residing at Billings, in the county of Yellowstone and State of Montana, have invented a new and useful Power-Transmitting Mechanism, of which the following is a specification.

This invention relates to improvements in power mechanisms, and the object is to provide a means for transmitting power from automobiles and other auto-vehicles to other machinery. The invention may also be considered as a further improvement upon the device disclosed in my application for Letters Patent of the United States filed Nov. 24—1915, Serial Number 63,257.

Figure 1:
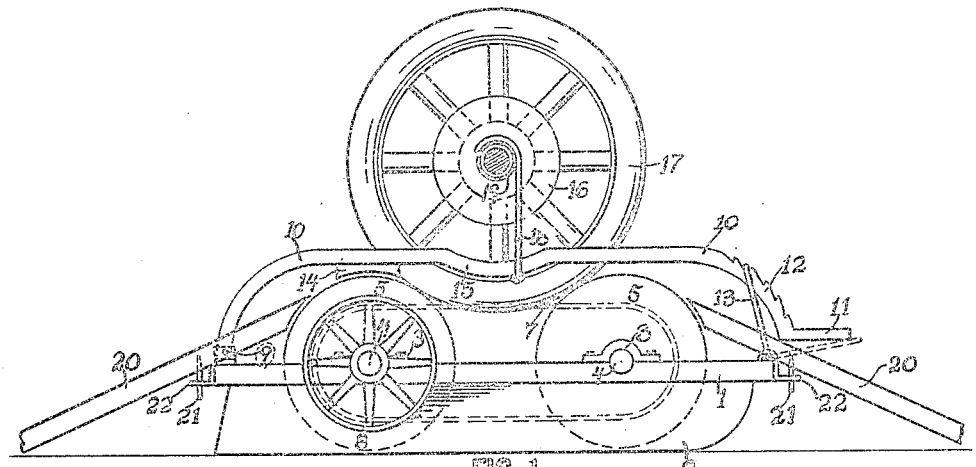
Figure 3:
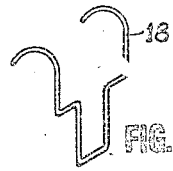
Figure 2:
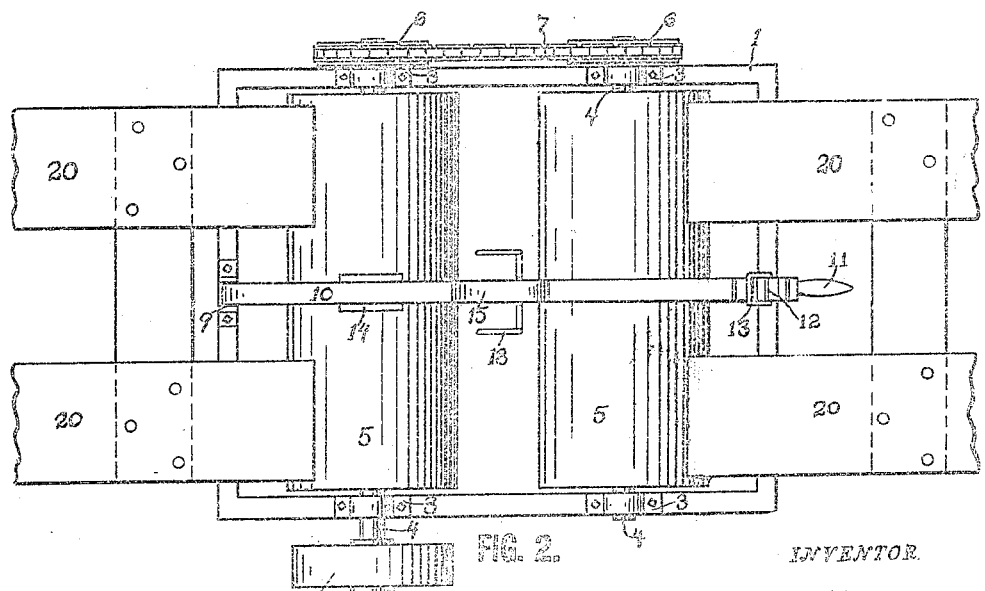

In the accompanying drawing:

Figure 1 is a side elevation of my improved power mechanism showing one of the hind wheels or drivers of an automobile in position thereon. Fig. 2 is a top or plan view of the power mechanism, and Fig. 3 is a perspective detail view of the axle engaging hook.

Referring to the drawing by reference numerals, 1 designates a suitable frame which is supported on runners 2 so as to be readily portable to any place where the automobile is to operate other machinery. If so desired the runners may be dispensed with and the device secured in stationary position.

Journaled in bearings 3 on the frame are the ends of shafts 4, fixed in drums or broad faced pulleys 5. Said shafts 4 are connected by sprockets 6 and an endless chain or link belt 7 so as to rotate in unison. At least one of the shafts is provided with a pulley 8 by which to engage a belt (not shown), by which power may be transmitted to working machinery of any kind.

Pivoted at 9 to one end of the frame is one end of a lever 10, the other end of which has a handle 11 and adjacent thereto a segmental rack 12 adapted to be engaged by a bail or clevis 13 pivotally secured to the adjacent end of the frame. Said lever 10 is provided with a brake shoe 14 arranged to brake one of the drums when the lever is depressed. The lever is offset downward at 15 so as to be sure to clear the gear housing 16 of any sized auto-vehicle, even those having the smallest size traction wheels 17. The lever is also provided with a hook 18, by which to engage the axle tube 19 of the automobile; preferably said hook is bifurcated so as to engage the tube at both sides of the gear-housing.

At each end of the frame is provided a detachable inclined bridge 20, which may be skeletoned, as shown, and provided with pegs 21 depending into perforated lugs 22 on the frame when the bridge is in such a position that its lower end is on the ground and the upper end is close to the adjacent drum.

In the operation of the device, an auto vehicle may run either backward or preferably forward upon the device until its traction wheels 17 occupy the position shown in Fig. 1, while this is being done the brake shoe 14 should be held in frictional contact with the adjacent drum by means of the lever 10 and clevis 13. After the automobile is thus put in place the lever 10 is raised sufficiently to let the hook 18 engage upon the axle tube 19, and as the lever is again depressed and engaged by the clevis 13 the automobile is not only held in place but the frictional contact of its wheels with the drums is increased by the downward pressure of the lever. A belt of any suitable kind is then placed upon the pulley 8 and engaged with the pulley of the working machine to be operated, and as the engine of the automobile is then started its power may be utilized for running a well pump, a feed cutter, a corn sheller or any other machinery desired to be run either on farms or in towns. When the work is done the hook 18 is disengaged from the axle tube, the brake shoe 14 applied to the drum below it, and the automobile is run off of the device and is ready to serve its usual purposes as an automobile or auto-vehicle.

What I claim is:

1. In a device for transmitting power from the engine of an automobile, the combination with a frame, a pair of parallel drums journaled in the frame and adapted to support the drivers of the automobile, operative connection between the two drums to cause them to rotate in unison, means carried by one of the drums for transmitting power from the same, and inclined approaches at both ends of the frame, a horizontally disposed lever pivoted at one end to one end of the frame, and having at its other end a handle and a ratchet sector near the other end of the frame a bail pivoted to said other end of the frame and arranged to engage the ratchet sector, a brake shoe fixed on the lever and arranged to engage one of the drums when the lever is depressed to a certain extent.

2. In a device for transmitting power from the engine of an automobile, the combination with a frame, a pair of parallel drums journaled in the frame and adapted to support the drivers of the automobile, operative connection between the two drums to cause them to rotate in unison, means carried by one of the drums for transmitting power from the same, and inclined approaches at both ends of the frame, a horizontally disposed lever pivoted at one end to one end of the frame and having its other end provided with a handle and a ratchet sector, a pivoted bail at the other end of the frame adapted to engage the teeth of the sector, a hook near the middle of the lever for engaging over the axle tube of the automobile and pressing downward on the same when the lever is depressed to a suitable extent for that purpose.

3. In a device for transmitting power from the engine of an automobile, the combination with a frame, a pair of parallel drums journaled in the frame and adapted to support the drivers of the automobile, operative connection between the two drums to cause them to rotate in unison, means carried by one of the drums for transmitting power from the same, and inclined approaches at both ends of the frame, a horizontally disposed lever pivoted at one end to one end of the frame and having its other end provided with a handle and a ratchet sector, a pivoted bail at the other end of the frame adapted to engage the teeth of the sector, a hook near the middle of the lever for engaging over the axle tube of the automobile and pressing downward on the same when the lever is depressed to a suitable extent for that purpose, said lever being offset downwardly near the middle to avoid contact with the gear-housing of the automobile axle tube.

In testimony whereof I affix my signature.

EUGENE R. SWAN.